United States Patent

Robinson

[11] 3,897,691
[45] Aug. 5, 1975

[54] GEAR CHANGING MECHANISM
[75] Inventor: Clayton F. Robinson, Philadelphia, Pa.
[73] Assignee: Honeywell Inc., Minneapolis, Minn.
[22] Filed: July 9, 1974
[21] Appl. No.: 486,769

[52] U.S. Cl. ................................................. 74/405
[51] Int. Cl. .......................................... F16h 57/00
[58] Field of Search ............................ 24/405, 432

[56] References Cited
UNITED STATES PATENTS
2,976,741  3/1961  Martin ................................ 74/432
3,610,304  10/1971  Popell ............................ 146/113 B
3,831,459  8/1974  Satzler et al. ..................... 74/432 X Primary Examiner—Leonard H. Gerin
Attorney, Agent, or Firm—Arthur H. Swanson; Lockwood D. Burton; John Shaw Stevenson

[57] ABSTRACT

Interlocking parts for a change gear and an associated drive gear enable the change gear to be rapidly locked for rotation to the drive gear and to be rapidly disconnected therefrom whereby another change gear having similar interlocking parts as the first mentioned change gear can be substituted for the first mentioned change gear.

4 Claims, 4 Drawing Figures

PATENTED AUG 5 1975     3,897,691

GEAR CHANGING MECHANISM

BACKGROUND OF THE INVENTION

1. Field of the Invention

The invention relates to an improvement in locks of the type generally classified as special application locks for control and machine elements gears.

2. Description of the Prior Art

It has been the practice in the prior art to employ a pair of change gears that contain a selected number of teeth on their respective peripheries in the gear reduction drive, such as one that is used to move a chart of a recorder, to drive such a chart at one desired speed and to use different arrangement of change gears to drive the chart at a different speed.

The prior art, such as is shown in the Kuntny U.S. Pat. No. 2,701,479 employs a pair of screw connections which are passed through the face of each one of a pair of change gears to connect them to each of the associated drive gears in a gear reduction unit of a chart driving mechanism.

In order to remove any one of the aforementioned change gears it is necessary, with the Kuntny patent arrangement to use a screwdriver whereby the aforementioned screw connections can be disconnected from their associated drive gears when a change in a change gear is desired. A replacement change gear for each of the previously mentioned change gears is then attached by means of the screw threaded members to the previously mentioned drive gears.

While a variable signal is being recorded on a slow moving chart it is often desired to quickly effect an increase in the speed of this chart through the use of a different set of drive gears whereby any instantaneous change taking place in the characteristic of that variable signal can be more clearly observed over a larger area of the chart.

Since the use of screw threaded connections to remove one change gear from and to mount another substitute change gear on a drive gear requires a considerable amount of time. Such connections are not suitable when a quick change from one chart speed to another is desired.

Another difficulty that has been encountered in the use of threaded screw connections to join different change gears to a drive gear in a gear reduction unit is that such screws are difficult to hold because of their small size and can therefore readily be lost during the removal of one change gear and the mounting of another. Locating replacement screws will thus extend the time it takes to replace one change gear with another.

SUMMARY OF THE INVENTION

One object of the present invention is to provide each one of a pair of drive gears of a gear reduction chart drive with a means for more rapidly removing associated change gears therefrom and for more rapidly mounting substitute pair of associated change gears thereon than has heretofore been possible with prior art arrangements.

It is another object of the present invention to provide interlocking parts of the aforementioned type that has no removable parts for each such change gear.

In accomplishing these and other objects there has been provided, in accordance with the present invention, a drive gear having a pair of interlocking key elements extending from one flat surface of the drive gear and integral therewith. The key elements each comprise a pedestal portion normal to the side of the gear and a finger portion supported in parallel relationship to the side of the drive gear. A correlated change gear includes a central opening therethrough, through which the hub of the drive gear may extend and a pair of key slots through which the interlocking key elements are adapted to extend. When the change gear is positioned on the drive gear and rotated in a direction to efffect engagement of the key elements of the drive gear with the surface of the change gear, the change gear is locked for rotation with the drive gear. A pin is supported by the drive gear and spring biased toward the change gear. When the change gear is properly oriented in the locked position relative to the drive gear, the pin projects into a suitable hole in the change gear to prevent that gear from being inadvertently rotated into an unlocked position.

To remove the change gear from the drive gear, the pin is forced, against the bias of the associated spring until it is clear of the hole in the change gear. The change gear may then be rotated to the unlocked position and removed from the drive gear. The pin remains captured in the drive gear. Hence, the change gear, itself, is the only part removed in the process of changing gears.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENT

Figure 1:
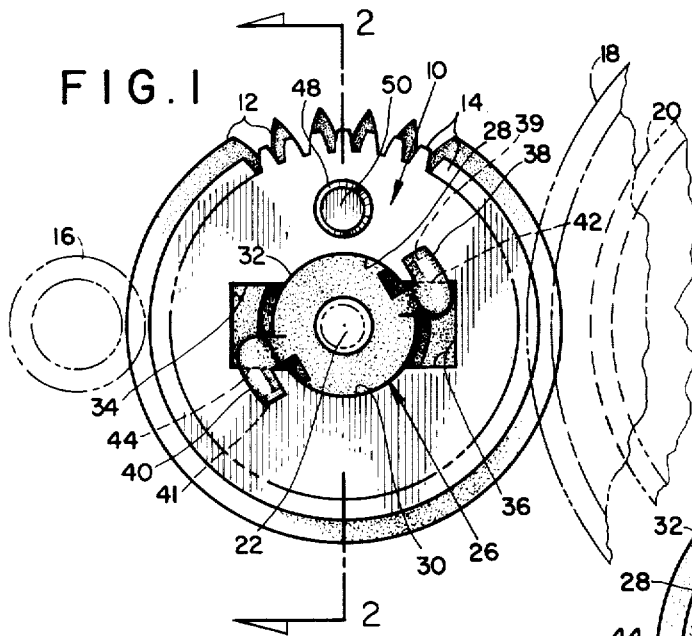
FIG. 1 is an elevation view of a gear reduction unit showing the change gear and an associated drive gear in interlocking relationship with one another.

For an understanding of the present invention reference will first be made to FIGS. 1 and 2.

The gear changing or interlocking mechanism 10 is shown positioned between a drive gear 12 and a change gear 14 which forms a part of a gear reduction chart drive comprised of a motor driven pinion 16, the first drive gear 12, the first change gear 14, a second change gear 18 and a chart driving gear 20.

Each of the drive gears 12, 20 are preferably made of a molded plastic material such as fiberglass reinforced nylon manufactured by Fiberfil Inc. under the name of Nylaglas and the change gears 14, 15 and pinion 16 are preferably made of a suitable steel material.

The drive gear 12 is mounted for rotary motion on the stub shaft 22 the inner ends of the latter being attached to a stationary wall 24. The change gear 14 has a key hole shaped slot 26 formed in the face thereof. The slot 26 includes two arcuate wall portions 28, 30. The change gear is shown mounted in rotatably supporting engagement on hub 32 of the portions 34, 36 of the key-hole shaped slot 26 are provided which respectively fit over associated first and second finger members 38, 40. Each finger member has a lead-in wedge shaped lip portion 39, 41. The portions 34, 36 of the slot 26 are also shown positioned about associated pedestals 42 and 44 which extend from the annular surface 46 of the drive gear 12.

Figure 3:
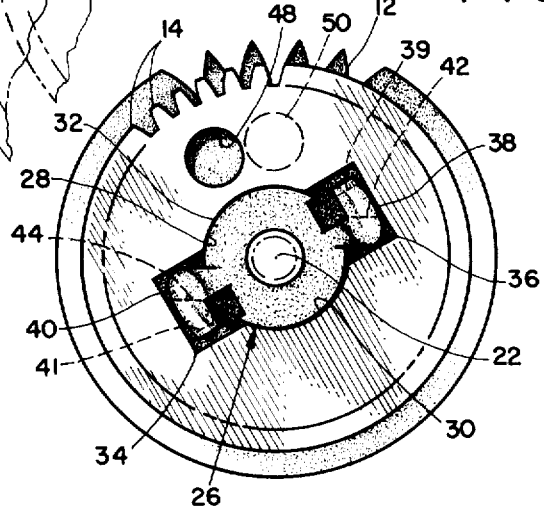
FIG. 3 is a front elevation view of the gear changing mechanism showing the change gear in a position to be mounted on the drive gear.
Figure 4:
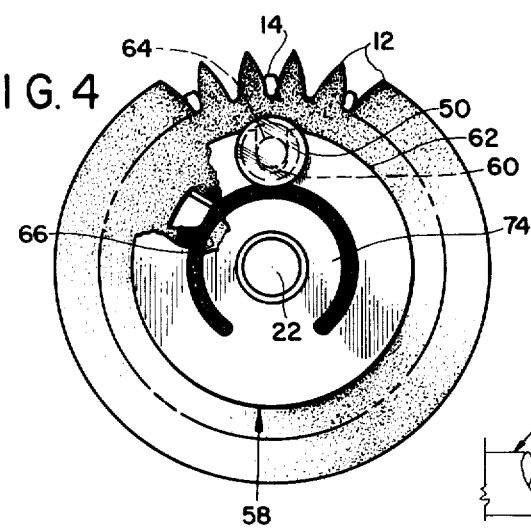
FIG. 4 is a right end view of the gear changing mechanism shown in FIG. 2.

FIG. 3 shows a circular opening 48 through the face of the change gear 14. An outer end of a pin 50 is shown in engagement with the rear surface of the change gear 14 and in angularly displaced relationship with respect to the opening 26. FIG. 1 and 2 show the change gear 14 in an angularly displaced position from that shown in FIG. 3 in which the longitudinal axes of the opening 48 is in alignment with the longitudinal axes of the pin 50. FIG. 2 shows the pin 50 supported for movement through a hole 52 in the drive gear 12.

One end of the pin 50 has two spaced annular collars 54, 56. The front surface of the collar 54 is in contact with the rear face of the drive gear 12.

The spring 58 has a C-shaped slot 60 defining an outer ring or annulus 62 and an inner ring or annulus 74. The inner annulus 74 has a central hole through which the stub shaft 22 extends. A U-shaped notch 60 is formed in the outer periphery of the annulus 62 at a position remote from the open part of the C-shaped slot 60 forming a bridge between the inner and outer rings 74, 62. The U-shaped notch 60 in the annulus 62 is arranged to fit into the groove 64 formed between the collars 54 and 56 of the pin 50. The C-shaped slot 60 is so dimensioned that the inner ring 74 is coextensive with the hub 66 of the drive gear 12. Thus, the inner ring 74 is held about the stub shaft 22 and between the adjacent faces 68, 70 of the hub 66 and the collar 72 surrounding the face of the stub shaft 22.

The outer ring 62 of the spring 58 is free to move axially while biased by the resilience of the bridge to the inner ring 74. Preferably, the spring member 58 is preformed to assume a normal position, as shown in full lines in FIG. 2, biasing the pin 52 to its fully seated position. An external cotter ring 76 is mounted in a groove, not shown, adjacent the free end of the stub shaft 22 and immediately adjacent the end face 78 of the hub 32. The cotter ring 76 thus retains the drive gear 12 rotationally free and in proper position on the stub shaft 22. The spring 58 applies a spring force to the pin 50 to bias the surface of collar 54 toward contact with the adjacent face of the drive gear 12, as shown in solid line form in FIG. 2.

Figure 2:
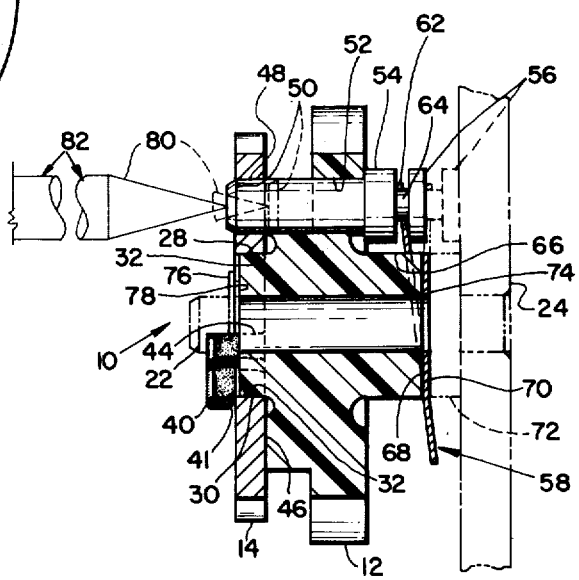
FIG. 2 is a section taken along section line 2-2 of FIG. 1.

Also shown in FIG. 2, in solid line form, is an object having a point on one end thereof, such as a sharpened pointed end 80 of a pencil 82, in contact with the free end of the pin 50. Shown in dash line form is the position to which the pin 50 may be moved inwardly against the bias of spring 58 and out of engagement with change gear 14, when the pencil is moved to its dash line position.

MODE OF OPERATION

When it is desired to mount the change gear 14 on the drive gear 12, the key hole shaped slot 26 formed in the change gear 14 is first positioned over the fingers 38, 40 and about the pedestal connections 42, 44 in the manner shown in FIG. 3.

Pressing the change gear 14 and the hub of the drive gear 12, since the holes 48 and 52 are misaligned, will cause the pin 50 to be pressed against the bias of the spring 58 to the position shown in dotted lines in FIG. 2. The change gear 14 is then rotated in a clockwise direction until the walls 34 and 36 of the key slot 26 contact the associated pedestals 42 and 44. As the clockwise movement is continued the tapered lips 39 and 41 will guide the outer face of the metal change gear 14 into tight contact with the remaining underside surface of the fingers 38 and 40. This action also causes the opposite or inner face portion of the change gear 14 to be moved into close surface contact with the adjacent face 46 of the drive gear 12.

Such interlocking of the change gear 14 with the drive gear 12 comprises a mechanism for retaining the change gear 14 against axial movement relative to the associated drive gear 12.

Movement of the change gear 14 from the position shown in FIG. 3 to the position shown in FIGS. 1 and 2 also allows the hole 52 in the drive gear 12 and the hole 48 in the change gear 14 to be brought into alignment with one another. When that occurs, the pin 50 is moved by the spring 58 from the dash line position to the solid line position shown in FIG. 2. Movement of the locking pin 50 to the last mentioned position will thus pin the change gear 14 to the drive gear 12 whereby the two gears are locked for simultaneous rotary motion.

When it is desired to remove the change gear 14 from the drive gear 12, the point of an object such as the point 80 of the pencil 82 is pressed against the free end of the pin 50 to force it against the biasing force of spring 58 and away from the solid line position towards the dash line position where the collared end is brought into abutting relationship with the stationary wall 24. That movement will allow the free end of the pin 50 to be positioned clear of the change gear 14. While the pin 50 is held in the retracted position, the change gear 14 may be manually gripped and rotated slightly in a counter-clockwise direction, toward the position shown in FIG. 3, until the free end of the pin 50 is brought into engagement with the rear flat surface of the change gear 14. The point 80 of the pencil 82 is then removed from contact with the head of the pin 50 and the counter-clockwise movement of the change gear 14 to its removal position, as is shown in FIG. 3, is then completed.

When the change gear 14 has been moved to the position shown in FIG. 3, it can be removed from the end of the hub 32 of the drive gear 12.

It is contemplated that the same type of gear changing mechanism 10 as that just described for the change gear 14 and drive gear 12 will also be used for the change gear 18 and the chart driving gear 20 shown in FIG. 1.

From the foregoing description it can be seen that there has been provided, in accordance with the present invention, a unitary structure for rapidly interlocking and disconnecting any one of many different combinations of change gear and drive gears.

The embodiments of the invention in which an exclusive property or privilege is claimed are defined as follows:

1. A readily detachable change gear assembly comprising,
    a drive gear member having a central hub extending from one face thereof,
    a plurality of hooked fingers extending axially from said face of said drive gear adjacent said hub, a change gear having a central opening therethrough complementary to said hub of said drive gear, said change gear having further openings therethrough positioned for cooperation with said hooked fingers, said change gear removably mountable on said drive gear with said central openings embracing said hub and with said fingers extending through said further openings, rotational motion in a first direction of said change gear relative to said drive gear causing the hooked portion of said fingers to frictionally overlay adjacent portions of said change gear clamping said change gear to said drive gear, said drive gear having an eccentrically located opening therethrough, said change gear having an eccentrically located opening therethrough, said eccentrically located opening in said change gear being so positioned as to be aligned with said eccentrically located opening in said drive gear when said change gear has been rotated to the clamping position relative to said drive gear, and a spring biased pin extending through both of said eccentrically located openings, when said openings are in alignment, whereby to effectively lock said gear against relative rotational movement with respect to each others.

2. The change gear assembly defined in claim 1 wherein said drive and change gears are mounted for rotation about a stub shaft and wherein said spring biased pin is comprised of a cantilever spring mounted on said stub shaft that has a portion thereof extending outwardly therefrom applying a force to a nonengaged end portion of said pin.

3. The change gear assembly defined in claim 2 wherein a C-shaped slot is formed in said cantilever spring to divide it into an inner and outer annulus, said inner annulus being retained in a fixed lateral position on said stub shaft between a hub on said drive gear and a collar on said stub shaft, said peripheral portion of said outer annulus having a U-shaped notched portion positioned about a reduced annular portion of said pin that extends between two collar portions thereof, thereby allowing said outer annulus of said cantilever spring to apply a force in a lateral direction from said stub shaft collar to move said pin in an outward direction and into said engagement with said opening in said change gear when said opening is aligned with said opening in said drive gear and to apply a force to the flat surface of said change gear that is adjacent said drive gear when said last mentioned openings are out of alignment with one another.

4. The change gear assembly defined in claim 1 wherein said drive and change gears are mounted for rotation about a stub shaft and wherein said spring biased pin is comprised of a cantilever spring mounted on said stub shaft that has a portion thereof extending outwardly therefrom applying a force to a non-engaged end portion of said pin and wherein said free end of said cantilever spring is mounted on said pin for movement in a lateral direction, thereby providing a force applying means of minimum dimension for maintaining said required force against said pin and its associated change gear.

* * * * *